United States Patent [19]

Ishizaki et al.

[11] Patent Number: 5,516,481

[45] Date of Patent: May 14, 1996

[54] SYSTEM FOR CONTAINERLESS PROCESSING OF MATERIALS UNDER A STATE OF COMPENSATE-GRAVITY

[75] Inventors: Kozo Ishizaki; Makoto Nanko, both of Nagaoka, Japan

[73] Assignee: Plata Ltd., Japan

[21] Appl. No.: 299,858

[22] Filed: Sep. 1, 1994

Related U.S. Application Data

[63] Continuation of Ser. No. 89,467, Jul. 12, 1993, abandoned, which is a continuation of Ser. No. 886,118, May 20, 1992, abandoned.

[30] Foreign Application Priority Data

May 22, 1991 [JP] Japan .................................. 3-147872
Oct. 18, 1991 [JP] Japan .................................. 3-299952

[51] Int. Cl.⁶ ............................................. B01J 3/06
[52] U.S. Cl. ...................... 264/443; 264/13; 264/15; 264/500; 75/340; 75/342; 75/953; 75/960; 72/38; 72/56; 29/421.1; 29/899
[58] Field of Search ............................ 264/5, 13, 15, 264/500, 22, 23, 519, 570, 443, 464; 156/DIG. 62; 425/6, 174.2, 174.8 R; 29/421.1, 899; 75/340, 342, 953, 960; 72/38, 56

[56] References Cited

U.S. PATENT DOCUMENTS

| 3,019,485 | 2/1962 | Diamond | 264/15 |
| 4,344,787 | 8/1982 | Beggs | 65/21.4 |
| 4,758,267 | 7/1988 | Webb | 156/DIG. 62 |
| 4,856,311 | 8/1989 | Conaway | 264/570 |
| 4,858,717 | 8/1989 | Trinh et al. | 181/0.5 |
| 4,885,118 | 12/1989 | Nagase | 264/13 |
| 4,929,400 | 5/1990 | Rembaum et al. | 264/5 |

FOREIGN PATENT DOCUMENTS

| 286310 | 10/1988 | European Pat. Off. . |
| 313069 | 4/1989 | European Pat. Off. . |
| 325660 | 8/1989 | European Pat. Off. . |
| 61-168596 | 7/1986 | Japan . |
| 444735 | 12/1974 | U.S.S.R. . |
| 1010303 | 11/1965 | United Kingdom . |

OTHER PUBLICATIONS

Subramaniam et al., Reactions in Supercritical Fluids—A Review, Ind. Eng. Chem. Process Des. Dev. 1986, 25, 1–12.
Price et al., "Hot Isostatic Pressing of Metal Powders", Metals Handbook, vol. 7, 1984.

*Primary Examiner*—Catherine Timm
*Attorney, Agent, or Firm*—M. Lukacher

[57] ABSTRACT

A pressure medium composed of plural kinds of fluids each of which have a different density is charged in a pressure chamber forming, for example, fluid layers. A material is suspended by way of buoyancy brought by this pressure medium. By properly controlling the density of the pressure medium of plural kinds of fluids, various kinds of materials having different densities can be supported in a suspending state at an almost constant pressure. The apparatus and the method processes the material under a state of compensated-gravitation, and is capable of forming an easy-handling weightless state for a long period of time at low cost in a simple manner for ease of handling of the material being processed and can contribute to developing useful materials and novel materials and to the supplying of them in bulk.

11 Claims, 6 Drawing Sheets

SYSTEM FOR CONTAINERLESS PROCESSING OF MATERIALS UNDER A STATE OF COMPENSATE-GRAVITY

This is a continuation of application Ser. No. 08/089,467 filed Jul. 12, 1993 now abandoned, which is a continuation of Ser. No. 07/886,118 filed May 20, 1992.

BACKGROUND OF THE INVENTION

The present invention relates to a containerless processing system (method and apparatus) for materials under a state of compensated-gravitation, wherein a material is processed under a state of substantially non-gravitation or of substantial weightless by compensating or inhibiting the influence of gravity.

Processing materials under a state of compensated-gravitation, makes it possible to form true spheres, or to melt materials without using a crucible so that it is possible to avoid contamination of impurities into the melt.

Heretofore, various experiments for preparing materials have been conducted under a state of non-gravitation (a weightless state) as follows: A satellite with an experimental equipment is launched into outer space by a rocket, so that a weightless state is to be made in outer space by compensating the gravitation of the earth with the centrifugal force arising as a result of the satellite flight. A weightless state may be caused by using a free-fall of the equipment from an elevated spot. A weightless state is induced by supersonic or electro-magnetic waves. These methods however, have drawbacks as follows. At first, the method in which gravitation of the earth is balanced with the centrifugal force brought by the satellite flight entails an enormous cost for launching and orbiting the satellite built in which the processing equipment is installed. The free-falling method can not be used for a process requiring a long period of time. It has not been possible to obtain a uniform weightless state by the method utilizing supersonic or electromagnetic waves, since they cause irregularity and deviation of the gravitation field. Accordingly, even though it was known that distinctly useful materials could be produced under a weightless state from experiments or theories, it has been practically impossible to manufacture useful material in sufficient quantities, since there was neither the means of providing a non-gravitational field readily at low cost, nor the means of keeping the non-gravitational state for a long period.

SUMMARY OF THE INVENTION

It is an object of the present invention to provide a containerless processing system (method and apparatus) for materials under a state of compensated-gravitation in which an easy-handling non-gravitational field is provided for a long period simply and at low cost and therefore can contribute to developing useful materials and new materials and supplying them in bulk.

A containerless processing method for materials under a state of non-gravitation according to the present invention subjects a material to a physical, chemical or metallurgical treatment in a pressurized medium which can contain various kinds of fluids (a plurality of different fluids) each of which has a different density from the other, whereby the material is processed under a state of substantial non-gravitation. In place of the pressure media consisting of such fluids, a single substance can be used having a distributed density variation in a vertical direction, or without such variation.

A containerless processing apparatus for materials under a state of compensated-gravitation according to the present invention comprises a chamber containing a material; means for filling said chamber with a pressure medium of a single substance having density variation in vertical direction or no variation in said chamber or with a pressure medium consisting of various kinds of fluids each of which has a different density; and means for treating said materials physically, chemically or metallurgically, located in said chamber. This pressure medium may be a highly pressurized single gas or liquid, or a highly pressurized mixture of a plurality of gases or liquids. These gases and liquids may be either of static or they can move. In a case where the pressure medium consists of a plurality of fluids each having a different density, these fluids can be arranged separately in layers, or mixed.

The invention is useful in subjecting a material to a physical, chemical or metallurgical treatment as by producing another material from a material by providing a physical, chemical or metallurgical change to the material; or manufacturing or processing material in various phases and physical compositions; or synthesis of a material by a chemical reaction; or glass-formation from a melt by heating and solidifying; or controlling of a fine structure. A physical, chemical or metallurgical change for materials means softening of the material, shape-transformation of the material or transformation of composition or structure.

In accordance with this invention, a state of compensated-gravitation can be formed in a highly pressurized medium. When a medium of such as gas or liquid is pressurized to a high pressure, the specific gravity of this medium becomes very large. Accordingly, an extremely large buoyancy acts on materials in the medium having a large specific gravity; thus making it possible to form a state of compensated-gravitation.

Generally, a gas is assumed as to have a small specific gravity. However, when a gas is subjected to high pressure, its specific gravity markedly is increased. For example, when Ar gas is pressurized to 1,000 atm. at room temperature, its specific gravity will be almost equal to that of water.

Figure 1:
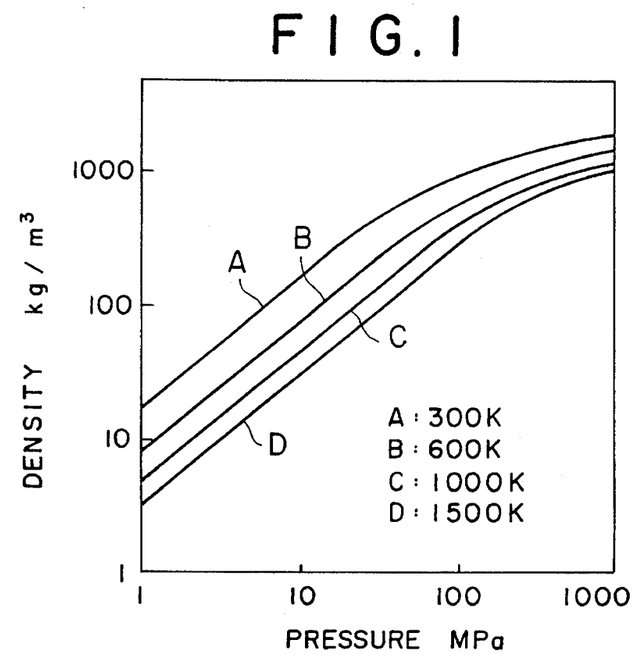
FIG. 1 is a graph showing relations between pressure and density, at temperatures of 300K, 600K, 1000K and 1500K, of Ar gas.

FIG. 1 is a graph which shows a relation of pressure and density of Ar gas at various temperatures, A, B, C and D. Pressure (MPa) is shown along the abscissa, and density of Ar gas ($kg/m^3$) is shown along the ordinate. This graph shows that a gas highly pressurized is capable of yielding an extremely large buoyancy.

As stated above, according to the present invention, a large buoyancy is obtained by a medium being subjected under a high pressure and therefore being given a large specific gravity. Accordingly, if a substance with a large molecular weight or atomic weight is selected for use, a large enough specific gravity to form a state of compensated-gravitation can be easily obtained at a relatively low pressure. In other words, use of a gas having a large specific gravity at ordinary pressure, makes it possible to generate a larger buoyancy.

Using a mixture containing a plurality of various kinds of fluids each having a different density as a pressure medium for providing buoyancy to a material, makes it possible to achieve containerless processing at the same pressure in a case where materials to be processed under a state of compensated-gravitation have various densities. In other words, by properly adjusting mixture ratio of a plurality of various kinds of fluids, the influence of pressure on materials can be made to be equivalent, regardless of kinds of materials to be processed. On the other hand, by providing variation for a single medium or a mixture medium of plural fluids in density along a vertical direction, a fine control of the medium pressure, which is required for suspending a material when a medium has no variation in density, becomes unnecessary.

Further, when oxygen, nitrogen or other reactive gas is mixed into the medium, it is possible to oxidize, nitride or react with the material to be processed, whereas if the material to be processed is an oxide, a nitride or other compounds (chloride and the like), it is possible to prevent its decomposition.

As discussed heretofore, according to the present invention, a material is suspended in a pressure medium consisting of single fluid or a plurality of different fluids, each of which has a different density and subjected to a physical or chemical treatment. With this treatment, the material may be processed to provide physical, chemical, metallurgical or other changes thereof, even in production. As a result, it is possible to apply an extremely large buoyancy on the material, whereby the material can be processed or produced under a state of substantially compensated-gravitation. In this invention, since such a weightless state can be obtained by an easy-controllable means, that is by control of the pressurizing of the medium, it is possible to carry out readily, and on an industrial scale, the processing of a material or manufacturing which requires a state of non-gravitation, and which, heretofore, has been required to be performed in outer space or under free-falling conditions. The present invention therefore provides a new and useful way of developing and manufacturing useful, and even novel, materials.

BRIEF DESCRIPTION OF THE DRAWINGS

FIG. 8 is a schematic view showing still another embodiment of the present invention, in which a material or a pressuring media can be locally heated by using an optical means such as an infra-red beam or the like;

DETAILED DESCRIPTION OF THE PREFERRED EMBODIMENTS

Now referring to the accompanying drawings, the presently preferred embodiments of the present invention will now be described.

Figure 2:
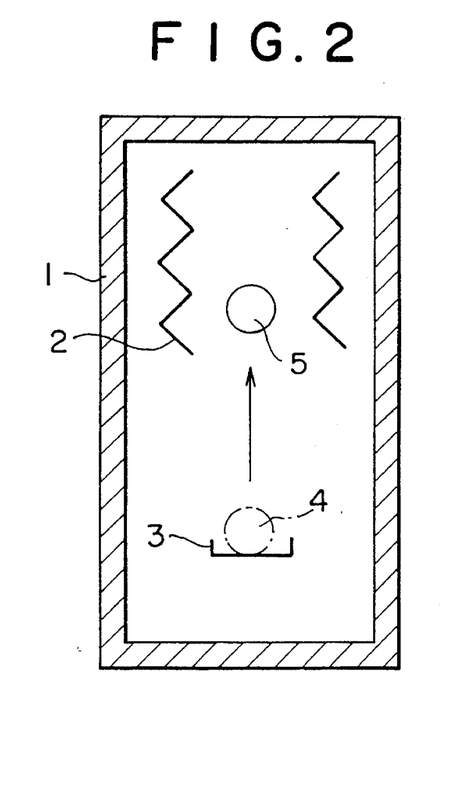
FIG. 2 is a schematic view showing an embodiment of the present invention, in which a material is processed by an apparatus comprising pressure vessel 1, heater 2 and sample plate 3.

FIG. 2 is a schematic view showing a method according to a first embodiment of the present invention. Heater 2 is installed in pressure chamber or vessel 1 for processing a material. Material 4 to be processed is put on a sample plate 3 and inserted into pressure chamber 1. In FIG. 2, unprocessed material 4 is shown with a dot-dash line. A medium such as a highly pressurized gas or the like in introduced into pressure chamber 1. Then, under influence of the high density of the pressure medium, material 4 is lifted by buoyancy of the medium from the position on sample plate 3 to the position aligned to heater 2 (as shown by material 5) and is kept floating at the position aligned to heater 2. Material 5 in this state is subjected to heat treatment by means of heater 2.

In this process, when a mixture composed of plural kinds of fluids each of which has a different density is used as the pressure medium, it is possible to equalize the influence of pressure on a material regardless of the kind of the material to be processed. In addition, by mixing oxygen, nitrogen, chlorine or other reactive gas into the medium used, it is possible to oxidize, nitride, chlorinate or react with the material to be processed, whereas it is also possible to prevent the material to be processed from dissolving when the material is compounds of oxygen, nitrogen, chlorine, or other reagents.

Figure 3:
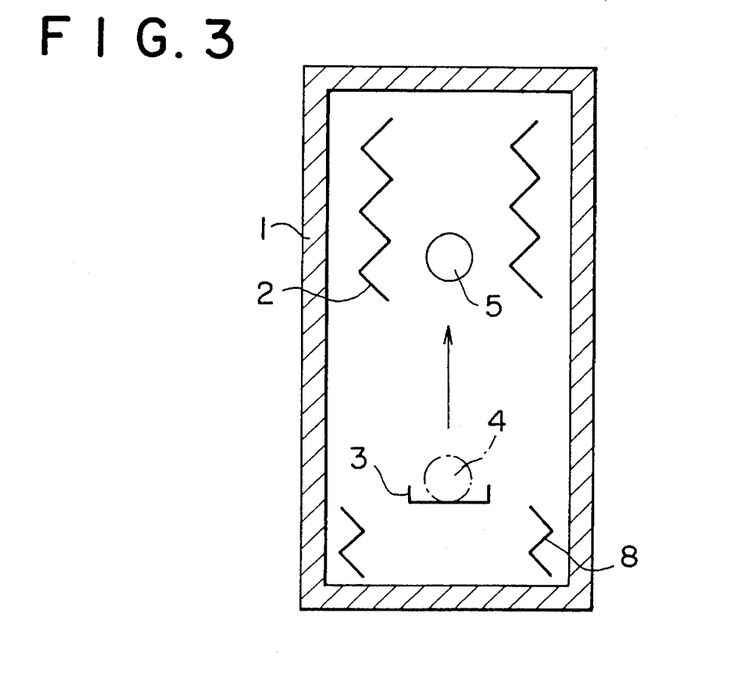
FIG. 3 is a schematic view showing an embodiment of the present invention, in which a mixture as a pressure medium is adapted to be circulated by convection heater 8.
Figure 4:
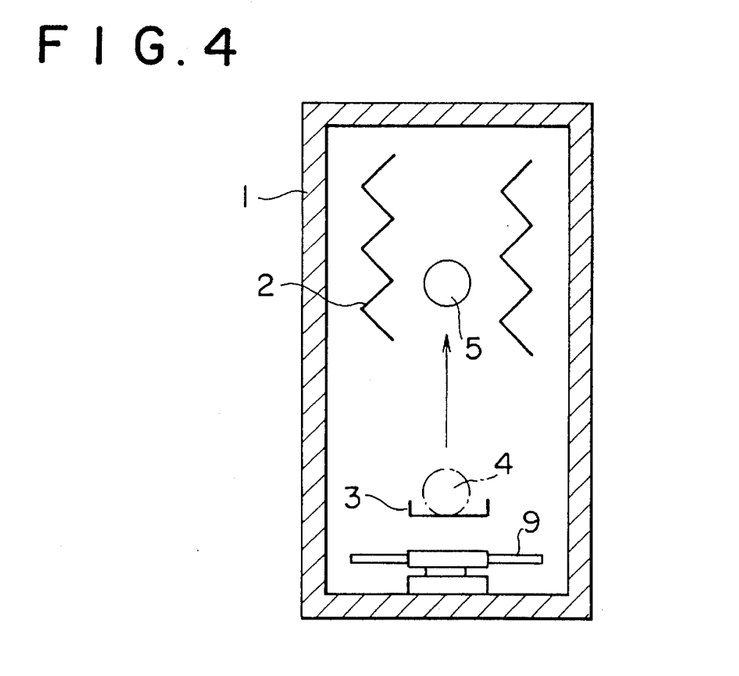
FIG. 4 is a schematic view showing another embodiment of the present invention, in which convection fan 9 is installed in place of the convection heater illustrated in FIG. 3.

In this case, if the mixture tends to separate, the separation can be prevented by generating convection using convection heater 8, as shown in FIG. 3, which heats the medium inside pressure chamber 1, or installing convection fan 9 at the bottom of pressure chamber 1, as shown in FIG. 4.

Where a plurality of different kinds of medium (e.g. fluids) each of which has a different density is used as the pressure medium, these fluids are made to be separated from one another. The separated fluid occupying the lower part of the vessel is selected so as to have a higher density than that of a material to be processed, while the medium occupying the upper part of the vessel is selected so as to have a lower density than that of the material. Consequently, the material is stabilized to be positioned at the interface between the fluid layers. With this method, fine control of the pressure required, when a single substance is used as the pressure medium, becomes unnecessary.

On the other hand, a pressure medium consisting of a single kind of gas can be adapted to vary in density along a vertical direction to change its buoyancy. By utilizing the variations of the buoyancy distribution, it is possible to automatically adjust the buoyancy in accordance with the weight of a material to be processed.

Figure 5:
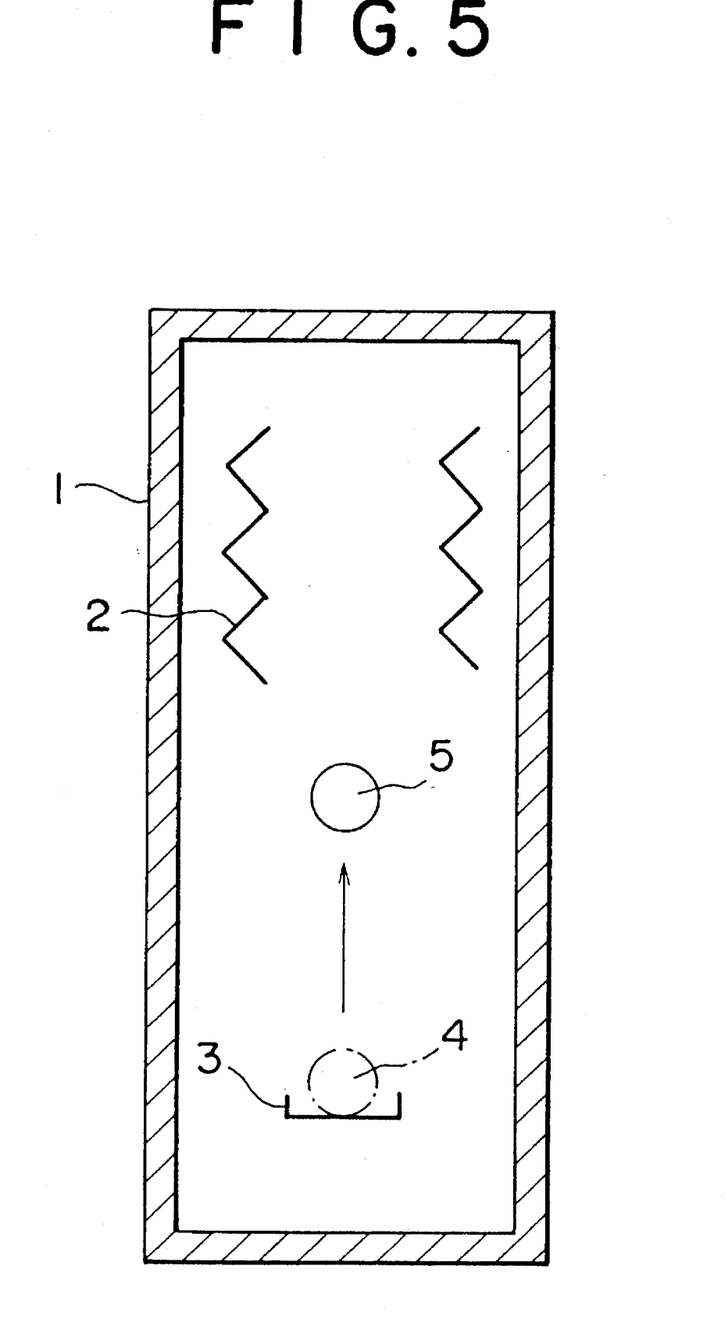
FIG. 5 is a schematic view showing still another embodiment of the present invention, in which a heater is installed at the only upper part of the vessel for forming a buoyancy distribution.

FIG. 5 shows an embodiment in which heater 2 for heating only the pressure medium occupies the upper part of the pressure chamber 1 so as to effectively generate an uneven buoyancy. With this, there occurs density variation along a vertical direction in pressure chamber 1, or a varying state of buoyancy occurs, and consequently it is possible to keep material 4 floating in a position in correspondence with its density. The pressure medium in this case consists of, as stated above, a single substance. Also a plurality of different kinds of fluids, each of which has a different density, may be used as the pressure medium.

Figure 6:
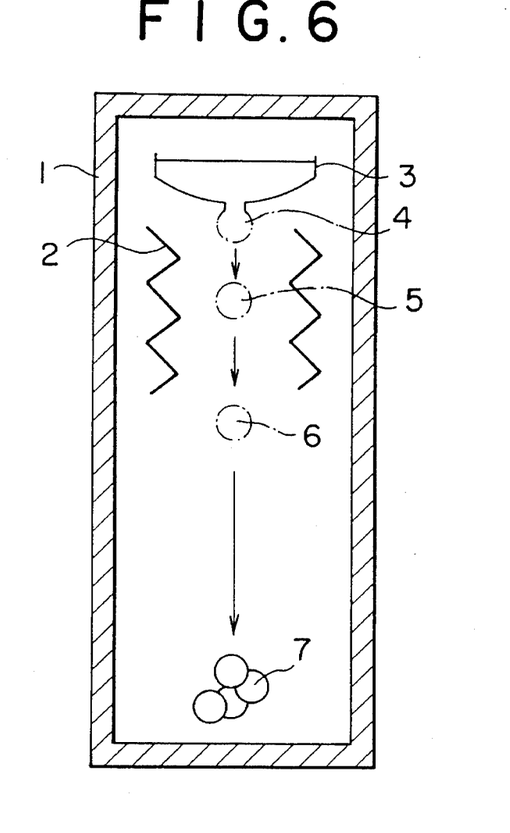
FIG. 6 is a schematic view showing still another embodiment of the present invention, in which a material can be continuously processed under a substantially weightless state.

FIG. 6 shows an embodiment of the present invention which enables continuous processing of a material. In this embodiment, heater 2 is provided for both heating a material positioned in the upper part of pressure chamber 1 and yielding a buoyancy distribution in the pressure medium. Above heater 2 is disposed a sample plate 3 for holding a material. With this arrangement, this heater 2 is adapted to heat the pressure medium at the upper part of pressure chamber 1 in order to make the density of the upper part medium lower than that of the lower part medium; thus forming a buoyancy distribution in which density increases from the top toward the bottom. In forming this distribution, the medium density at the upper part of the chamber is made to be lower than that of a material to be processed, whereas the medium density at the lower part of the chamber is made to be higher than that of the material.

In the apparatus of FIG. 6, material 4 (the unprocessed material) is supplied as droplets from the lower center portion of sample plate 3. The medium density is relatively low at the upper end of the chamber, so that material 5 (the material being processed) gradually moves downward, and is heated by heater 2 at the position in which heater 2 is disposed. Then, the material moves downward below heater 2, and thus falling material 6 (the processed material falling) is cooled down. With the material moving downward, increasing buoyancy is exerted on the material, whereby material 7 stops moving at the lower part of the chamber 1 and is suspended). As stated above, according to the present invention, the material is processed while falling in the medium having a buoyancy distribution, and thus processed material 7 can be cooled and collected while being floated and suspended. As a result, it is possible to process materials continuously without using a vessel therefor.

Figure 7:
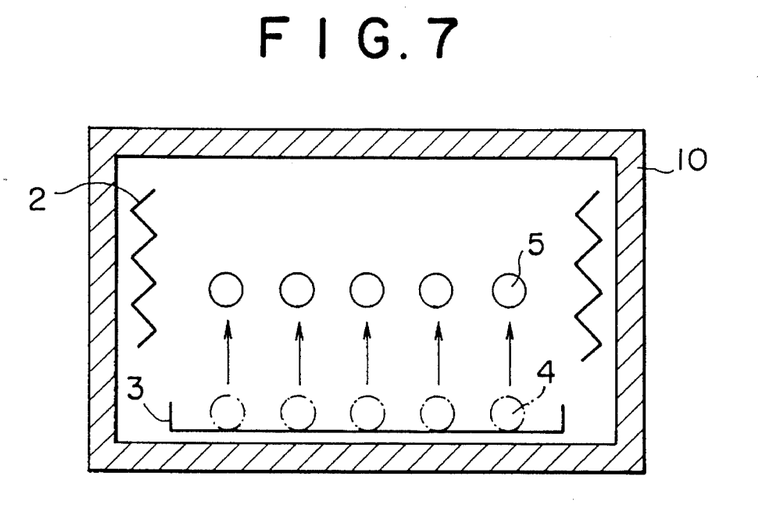
FIG. 7 is a schematic view showing still another embodiment of the present invention, in which a plurality of materials can be processed simultaneously using a horizontally long pressure chamber.

FIG. 7 is a schematic view showing still another embodiment of the present invention. In this embodiment, flat or laterally long pressure chamber 10 is used, and sample plate 3 is disposed on the bottom. Material 4 are fed in a large amount on this sample plate 3 and therefore can be subjected simultaneously to various treatments as stated above, such is physical, chemical and metallurgical treatment.

Figure 8:
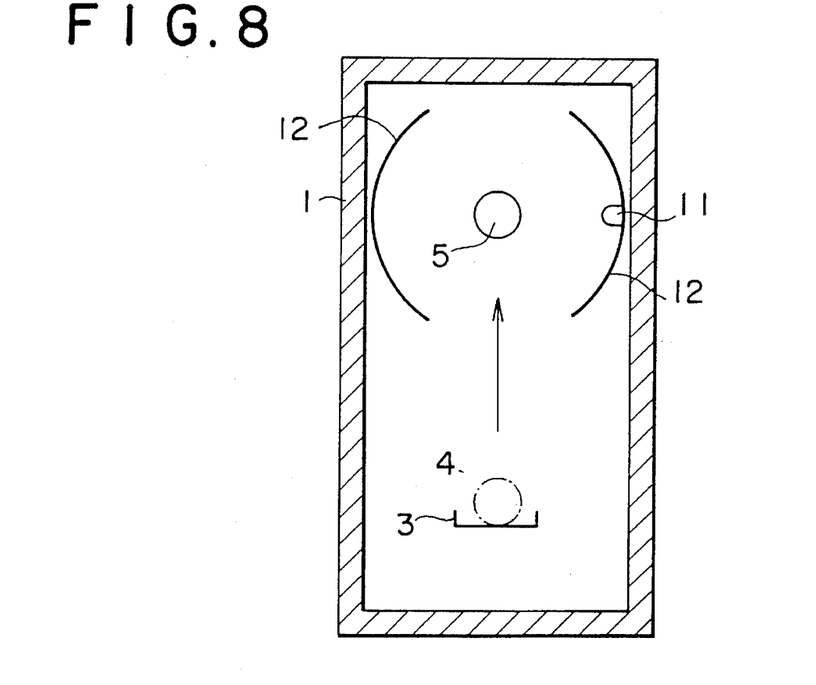

FIG. 8 is a schematic view showing still another embodiment of the present invention. In this embodiment, the material being suspended can be manipulated so as not to move freely and touch, for example, the heater in vessel.

In the embodiment of FIG. 8, there are disposed optical heat source 11 such as emitting an infrared beam or the like, and concave mirrors 12 in the upper part of the vessel. With this configuration, it is possible to locally heat the place around the focal point of concave mirrors 12, thus making low the density of the pressure medium around the focal position. Consequently, when material 5 ascends and reaches the low density portion, material 5 halts or rests at the interface between the low density portion and the high density portion with a part of the material being positioned in the low density portion and the rest part being positioned in the high density portion. In addition, since there is provided a density distribution in a horizontal direction, and if material 5 is likely to move in a horizontal direction, the material 5 is inhibited from moving and rests at the desired position. Thus, according to this embodiment, it is possible to stabilize material 5 at a predetermined position.

Figure 9:
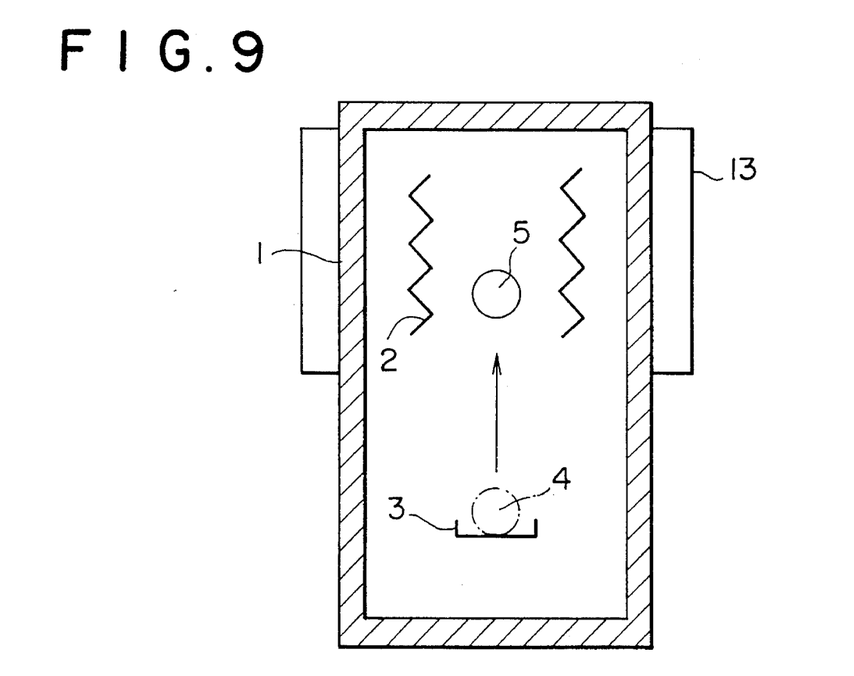
FIG. 9 is a schematic view showing still another embodiment of the present invention, in which a supersonic generator is disposed outside a pressure chamber.

In each embodiment of the invention, it is possible to halt the material in a lateral direction or provide an auxiliary support of the material in a vertical direction by utilizing supersonic and/or electromagnetic induction. FIG. 9 shows an embodiment in which supersonic generator 13 is disposed outside the chamber 1. With this supersonic generator 13, material 5 can be suspended not only by the buoyancy of the pressure medium but also the sound pressure of supersonic. Accordingly, the sound pressure generated by this supersonic generator 13 can be used as a lateral support as well as an auxiliary suspending means supplementing the pressure medium.

Figure 10:
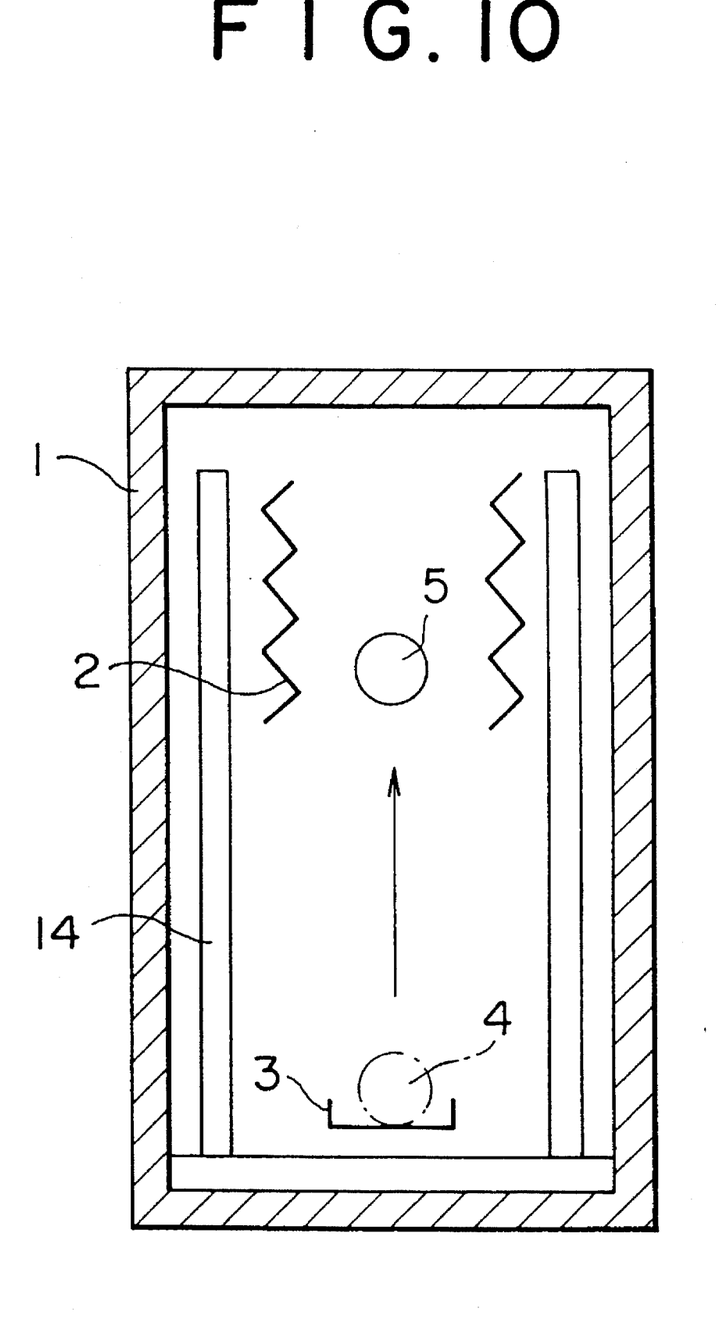
FIG. 10 is a schematic view showing still another embodiment of the present invention, in which a supersonic generator is installed inside a pressure chamber.

FIG. 10 shows an embodiment in which supersonic generator 14 is disposed inside the pressure chamber 1 for performing the same effect as in FIG. 9. In place of using the sound pressure of supersonic for secondarily supporting the material, it is also possible, if a material is electrically conductive, to make the material carry magnetic force, as by means of electro-magnetic induction coil, utilized as an auxiliary suspending means.

Further, in using any of the apparatuses described above, it is also possible to subject a material to heat treatment or other treatment by the procedure comprising the steps of: pressurizing a medium at room or other ordinary temperature; introducing the pressurized medium into the chamber to suspend a material, charging and enclosing this pressure medium into the chamber by closing a valve; and heating at constant volume the pressure medium enclosed in the chamber while keeping the buoyancy constant, that is, while keeping the material suspending at a constant position.

It is possible in practicing the invention to keep a material suspended at ordinary (e.g. room) temperature, if the suspending state of the material is desired at ordinary temperature, in that specific gravity of gas medium does not vary in isometric change.

In each of the embodiment, stated above, as for the means for pressurizing a medium, an HIP (hot isostatic pressing) unit, for instance, can be used. The HIP unit has been widely used as a means for obtaining a highly pressurized environment in various fields of the material manufacture, and this makes this invention practicable for industrial production purposes.

In use of the HIP unit, a material is charged into a chamber of the HIP. When the inside of the chamber is highly pressurized, after the chamber is filled with a predetermined medium, for example, argon gas, the material charged in the chamber is subjected to buoyancy; thus enabling the material to be suspended. In this state, the material is treated or formed into a desired material by providing physical, chemical, metallurgical or other changes. Various treatments can be obtained by preparing a specific HIP unit for each such treatment.

As discussed above, according to the present invention, it becomes possible to conduct on earth (at ground level) instead of in outer space or under free-fall conditions, material manufacturing processes, specifically, material synthesis by melting without using a container, control of crystal growth, preparation of true spheres and the like. Moreover, since the pressurizing means itself is an established technology, the present invention is generally useful in industrial applications.

Note that the medium used in this invention is in the fluid state, i.e., gas or liquid, before pressurization. Even though a gas is used as a medium, some kinds of media change from the gas state into the liquid state when the medium is pressurized. Of course the fluid state includes liquid and gas state, which are not possible to differentiate above the critical point of the substance. Accordingly, even if, for example, a gas-state medium in charged into the chamber of a HIP unit, the medium may change into the liquid state when the medium is being pressurized to create a state of compensated-gravitation.

A liquid medium can be also pressurized. When a liquid-state medium in which a material is charged is to be pressurized, however, the compression ratio of a liquid is smaller than that of a gas, so that the variation in specific gravity due to pressure is small; thus only a solid which has a specific gravity close to that of the liquid medium can be suspended in a state of compensated-gravitation. Therefore a liquid may be ineffective as a medium. In contrast, when a gas medium is pressurized, a large variation in specific gravity can be obtained with small change in pressure, so that various kinds of solid materials can be advantageously suspended as in a state of compensated-gravitation by controlling the pressure.

The examples of the present invention in which a normal HIP unit is used will be described hereinafter with reference to the comparative examples.

EXAMPLE 1

In this example, a sphere of polyethylene was produced. A pressure medium of argon gas was used in HIP unit. The material was heated at temperature of 160° C. for one minute in the pressure medium of 130 MPa. The pressure of the pressure medium was controlled in a narrow range to suspend the material in the chamber.

EXAMPLE 2

In this example, a $B^2O^3$ glass sphere was produced in HIP unit by using a pressure medium of xenon gas. In this treatment, the glass material was heated to 600° C. for 30 minutes. In order to suspend the glass material, hydrostatic pressure of about 200 MPa was applied to the pressure medium. This treatment condition was for the glass sphere of about 10 mm diameter.

The thus formed glass sphere was measured on its sphericity was 0.05 μm, which was as high as the highest precision of the steel balls used for the industrial bearings.

EXAMPLE 3

In this example, a sphere of Nylon-6 was produced. A pressure medium of argon gas was used in HIP unit. The material was heated at temperature of 250° C. for 30 minutes in the pressure medium of 350 MPa. The pressure of the pressure medium was controlled in a narrow range to suspend the material in the chamber. These conditions were for producing a sphere of about 10 mm diameter.

Sphericity of the obtained Nylon-6 sphere was about 2 μm, which was as high as the balls of Nylon-6 produced by conventional industrial processes.

EXAMPLE 4

In this example, a material was to be treated using a pressure medium of plural fluids being arranged in layers horizontally. $B^2O^3$ glass was treated with a pressure medium consisting of xenon gas and argon gas. In filling the gases, at first argon gas, and then xenon gas was injected. In this treatment the glass material was heated to 600° C. and at this temperature kept for 230 minutes. In order to float the glass material, a hydrostatic pressure of 200 MPa was applied to the above-mentioned gas mixture. In this case, no fine controlling of pressure was required unlike the case of using a single gas.

The thus formed glass sphere was measured on its sphericity by a sphericity measuring device. The resultant sphericity was 0.05 μm, which is as high as the highest precision of steel balls used for the industrial bearings.

EXAMPLE 5

In this example, mass-production was performed according to the present invention. At first, continuous processing was effected using a continuous processing apparatus as shown in FIG. 6 with $B^2O^3$ under xenon gas at 400 MPa, 600° C. As a result, a result equivalent to that obtained with example 4 was obtained.

A large, amount of material was processed at the same time using a flat cylindrical pressure vessel as shown in FIG. 7. The use of a pressure vessel having such a shape allows a large area for setting material, thus making it possible to treat large quantities at once.

Variations and modifications in the herein described system (the methods and apparatus disclosed above to elucidate the invention), within the scope of the invention, will undoubtedly suggest themselves to those skilled in the ark. Accordingly, the foregoing description should be taken as exemplary and not in a limiting sense.

What is claimed is:

1. A containerless processing method for a material under a state of compensated-gravitation comprising the steps of:

charging and enclosing said material in a chamber;

introducing a gas into said chamber;

pressurizing said gas to raise the density of said gas to obtain a highly pressurized pressure medium and thereby suspending said material in said chamber; and subjecting said material to a physical, chemical or metallurgical treatment under a state of substantially non-gravitation due to the pressurizing of said gas.

2. A containerless processing method according to claim 1 wherein the pressure medium is composed of a plurality of different kinds of gases of different densities.

3. The method according to claim 2 wherein said plurality of different kinds of gases are separated from one another by being horizontally layered, and said material is supported in an interface zone between respective layers.

4. The method according to claim 1 where said pressurizing step provides density variation for said medium in a vertical direction.

5. The method according to claim 1 wherein the upper part of said chamber is locally heated, whereby providing density variation for said pressure medium in a vertical direction.

6. The method according to claim 1 wherein the upper part of said chamber is locally heated, whereby providing density variation for said pressure medium in a vertical direction.

7. The method according to claim 1 wherein only said material or the part of said pressure medium which is around the material is heated to define a density variation in said material or part of said medium which is centered at a focal point where said material is located, whereby said material is suspended and fixed in position at said point.

8. The method according to claim 2 wherein only said material or the part of said pressure medium which is around the material is heated to define a density variation in said material or in said medium centered at a focal point where said material is located, whereby said material is suspended and fixed in position at said point.

9. The method according to claim 1 wherein induction selected from the group consisting of electro-magnetic induction and a supersonic induction suspends said material as an auxiliary support.

10. The method according to claim 2 wherein induction selected from the group consisting of electro-magnetic induction and supersonic induction suspends said material as an auxilliary support.

11. A containerless processing method for a material under a state of compensated-gravitation comprising the steps of:

charging and enclosing said material in a chamber;

introducing a gas at about room temperature into said chamber;

pressurizing said gas to raise the density of said gas to obtain a highly pressurized pressure medium and thereby suspending said material in said chamber;

sealing said medium in said chamber;

heating said material and medium isometrically to a desired temperature, whereby said medium is kept at constant density in said heating step; and subjecting said material to a physical, chemical or metallurgical treatment under a state of substantially non-gravitation due to the pressurizing of said gas.

* * * * *